United States Patent
Leetsch et al.

(10) Patent No.: US 7,425,247 B2
(45) Date of Patent: Sep. 16, 2008

(54) METHOD FOR PRODUCING AN AQUEOUS SOLUTION HYDROXYLAMINE

(75) Inventors: Norbert Leetsch, Leuna (DE); Thomas Strecker, Thalheim (DE); Manfred Kretschmar, Halle (DE); Joachim Seidler, Halle (DE)

(73) Assignee: Domo Caproleuna GmbH, Leuna (DE)

( * ) Notice: Subject to any disclaimer, the term of this patent is extended or adjusted under 35 U.S.C. 154(b) by 508 days.

(21) Appl. No.: 10/530,917

(22) PCT Filed: Feb. 13, 2004

(86) PCT No.: PCT/DE2004/000301

§ 371 (c)(1),
(2), (4) Date: Jun. 17, 2005

(87) PCT Pub. No.: WO2004/085308

PCT Pub. Date: Oct. 7, 2004

(65) Prior Publication Data

US 2006/0032734 A1 Feb. 16, 2006

(30) Foreign Application Priority Data

Mar. 27, 2003 (DE) .............................. 103 14 492

(51) Int. Cl.
*B01D 3/34* (2006.01)
*B01D 3/42* (2006.01)
*C01B 21/14* (2006.01)
*C01C 1/00* (2006.01)
*C07C 239/00* (2006.01)

(52) U.S. Cl. .............................. 203/2; 203/28; 203/49; 203/95; 203/DIG. 6; 423/387

(58) Field of Classification Search .............. 159/47.1; 203/2, 28, 49, 95, DIG. 6; 423/352, 387; 564/301

See application file for complete search history.

(56) References Cited

U.S. PATENT DOCUMENTS

| 5,472,679 A | 12/1995 | Levinthal et al. |
| 5,510,097 A * | 4/1996 | Cawlfield et al. ........... 423/387 |
| 5,837,107 A | 11/1998 | Watzenberger et al. |
| 6,299,734 B1 | 10/2001 | Watzenberger et al. |
| 6,531,108 B1 * | 3/2003 | Bansho et al. .............. 423/387 |
| 6,534,681 B1 | 3/2003 | Watzenberger et al. |
| 7,029,557 B2 * | 4/2006 | Wostbrock et al. .......... 564/298 |
| 2001/0011633 A1 | 8/2001 | Watzenberger et al. |

FOREIGN PATENT DOCUMENTS

WO  WO 97/22551  6/1997

* cited by examiner

*Primary Examiner*—Virginia Manoharan
(74) *Attorney, Agent, or Firm*—Welsh & Katz, Ltd.

(57) ABSTRACT

This invention relates to a method for producing an aqueous solution of free hydroxylamine (HA) by simultaneous countercurrent treatment of a HA salt with ammonia or ammonia water, then separating the HA by distillation and reconcentrating the aqueous HA solution in a countercurrent with a stripping medium. The stripping medium used according to the invention is a mixture of steam and a non-condensable inert gas and the process temperature at a defined pressure is controlled by the quantity of non-condensable inert gas at the column inlet. The preferred non-condensable inert gas is nitrogen. This results in increased safety and a reduction in losses of the method for producing aqueous solutions of free HA.

6 Claims, 1 Drawing Sheet

METHOD FOR PRODUCING AN AQUEOUS SOLUTION HYDROXYLAMINE

FIELD IF THE INVENTION

Figure 1:
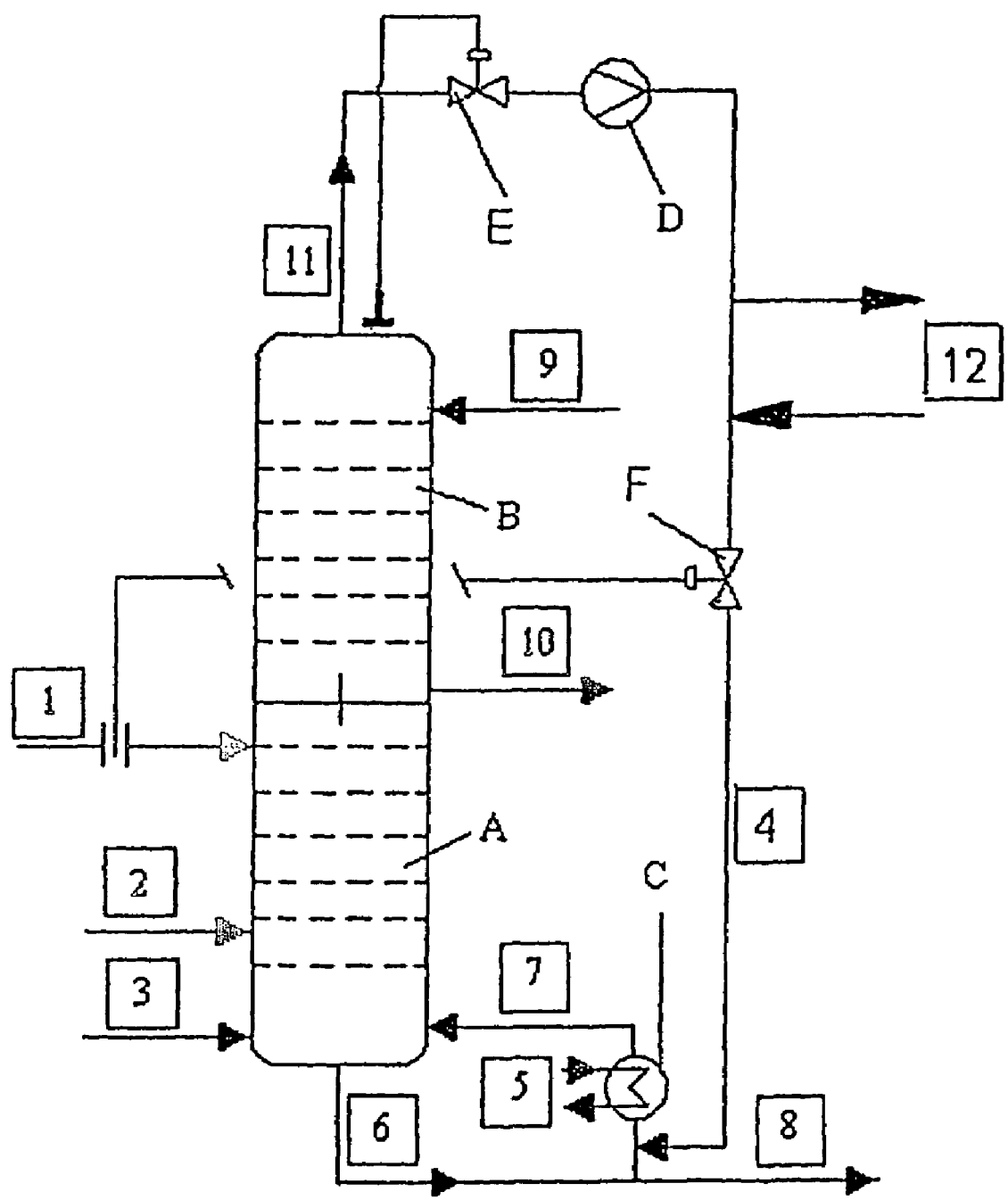

This invention relates to a method for producing an aqueous-solution of free hydroxylamine (HA) by simultaneous countercurrent treatment of a HA salt with ammonia or ammonia water, then separating the HA by distillation and reconcentrating the aqueous HA solution. According to the invention, this results in improved safety and a reduction in losses of the method for producing aqueous solutions of free HA.

BACKGROUND OF INVENTION

Special safety conditions must be complied with when producing HA as thermal instability is one of its properties, i.e. it decomposes in an explosion, especially in the presence of metal ions, in strongly alkaline media, and at high temperatures and concentrations. The thermal composition of HA causes irreversible losses and reduces product yield.

The main ways of improving the method for producing HA are: producing highly pure HA, especially for the electronics industry; increasing efficiency of the HA production method and increasing the safety of the HA production method.

A method for producing a highly pure stabilized aqueous solution of free HA by treating an aqueous, anion-containing solution of free HA with an anion exchanger in alkaline form and mixed with a HA stabilizer is known from German patent DE 19936594 A1. The alkaline form of the anion exchanger is prepared using any base, particularly ammonia.

The disadvantage of this known method is its high cost due to the high price of the anion exchanger. In addition, the method is not highly efficient, in particular when its use is limited to solutions for the electronics industry.

U.S. Pat. No. 5,472,679 describes a method for producing an aqueous HA solution by reacting a solution of hydroxyl ammonium sulfate (HAS) with a suitable base at a temperature of ca. 60° C. The mixture obtained is then subjected to distillation under reduced pressure at a temperature below 65° C. There are considerable losses in HA due to its thermal decomposition at higher temperatures. A solid bottom residue is obtained (when releasing the HA formed salt), and the distillate is an aqueous solution containing 16 to 23% of HA.

This method does not provide sufficient technological safety. Water is separated during evaporation resulting in an increased HA concentration. It is known that the inclination of HA to decompose increases when its concentration rises to >70 percent by weight. There is a growing risk that the high HA concentration initiates the explosive decomposition of HA.

In addition, this method for producing an aqueous HA solution is not sufficiently reliable in plant operation because the solid bottom residue (e.g. sodium sulfate) accumulates on the inner walls of the apparatuses and forms deposits that are difficult to remove, impair the function of the apparatuses, and create the conditions for equipment failure. The setbacks of this method also include insufficient efficiency. Vacuum pumps or vapor exhausting devices are required for performing the distillation under reduced pressure, which increases both energy and operating costs of the method.

A method for producing an aqueous solution of free HA by treating a HA salt with a base, separation of the solution obtained by distillation into an aqueous HA fraction and a salt fraction at temperature above 80° C. and subsequent reconcentration of the aqueous HA solution by stripping it with vapor in a distillation column is known from patent publication WO 97/22551.

It is a disadvantage of this method that the HA solution is contaminated with sodium ions if caustic soda is used as a base. The presence of a metal ion in the product creates the risk of explosive decomposition of HA, which characterizes the low degree of technological safety this known method has. In addition, salt (sodium sulfate) can be precipitated at the bottom of the stripping column, which reduces the reliability of plant operation, requires thorough monitoring of the technological parameters, and considerably increases the costs of this method.

A disadvantage of the known method, if ammonia is used as a base, is insufficient HA yield of about 60-70%. This is because ammonia is a weaker base than caustic soda, for example, which completely pushes HA out of HA sulfate. In the known method, more than 30% of HA are discharged in the form of HAS as waste from the bottom of the distillation column and thus prevented from further use. The significant HA losses with wastewaters and the necessity of treating this waste considerably increase the expenses (costs) of the known method, making its industrial-scale application inefficient.

A method of processing HA-containing solutions by stripping the HA with steam is known from patent publication DE 10004818. Its disadvantage is its high energy demand as the method involves distillation in a vacuum. This known method lacks the use of intrinsic energy.

A method for producing an aqueous solution of free HA by simultaneous countercurrent treatment of an HA salt solution with ammonia or ammonia water as a base, separation of the solution obtained into an aqueous HA solution and a salt fraction by distillation, reconcentration of the aqueous HA solution by distillation with vapor in a distillation column is known from patent publication WO 99/07637. Analogous applications are DE 197 33 681 A1 and EP 1 012 114.

The major disadvantages of this method are insufficient technological safety and increased HA losses due to its thermal decomposition. Insufficient safety of the method is due to the physical properties of HA and process specifics of this method. Furthermore, safety conditions for the known method are not ensured over the entire range of pressure below (under a vacuum) and above atmospheric pressure. When using the known method under a vacuum, thermal decomposition of HA and its losses are insignificant but there is a risk that ambient air is sucked in when the reactive distillation column is relieved and an explosive air/ammonia mixture can develop in the reactive distillation column. In addition, reaction of HA with oxygen in the air produces nitrites that increase the risk of an explosion.

This risk of local formation of an explosive ammonia/air mixture when the column operated under vacuum is relieved is present not only in the reaction but also in the distillation part of the column. Using the known method, if there is excess ammonia (excluding HAS losses) in the reaction part of the column, it is stripped and discharged in the gaseous phase from the head of the column. The presence of ammonia both in the reaction and in the distillation parts of the column considerably reduces the technological safety of the known method when performed under a vacuum.

If the known method is performed at increased pressure, i.e. a pressure above atmospheric pressure, formation of an explosive ammonia/air mix is excluded (when the column is relieved), however, another risk arises: When the process temperature is raised above 100° C., HA losses increase significantly according to the conditions of the vapor/liquid equilibrium, and the risk of explosion arises from the thermal decomposition of the HA. If steam is used at a pressure of about 1.5 bara (at a temperature of ca. 130° C.) in the known method, local overheating of the HA solution occurs in the reaction part of the column, resulting in increased HA separation and a decrease in HA yield. This reduces the productivity of the HA production process until the vapor changes into thermodynamic equilibrium with the solution. Areas of local overheating of the HA solution may even occur at the considerable height of the reaction part of the column.

A decrease in safety of the known method for producing HA therefore results in the following disadvantages:

Increase of the thermal decomposition of HA with the risk of explosion due to the raised temperature of the process above atmospheric pressure.

Reduction of the HA yield due to increased thermal decomposition.

Risk of formation of an explosive ammonia/air mixture and of nitrites when relieving the column that is operated below atmospheric pressure (under a vacuum).

It is the problem of the invention to improve the safety of the method for producing aqueous solutions of free HA and to increase the yield of free HA.

SUMMARY OF THE INVENTION

This problem is solved by a method for producing an aqueous solution of free HA using simultaneous countercurrent treatment of a solution of a HA salt with ammonia or ammonia water, separation of the HA solution obtained by distillation into aqueous solutions of HA and a salt fraction under a pressure above the atmospheric pressure, reconcentration by distillation of the aqueous HA solution in the countercurrent with a strip medium in a reactive distillation column with a liquid-phase evaporator, the stripping medium according to the invention being a mixture of steam and a non-condensable inert gas and the process temperature being controlled at a defined pressure by the quantity (in percent by weight in relation to the quantity of HAS solution) of non-condensable inert gas at the column inlet.

The preferred non-condensable inert gas is nitrogen.

The process temperature is controlled based on the following principle:

An increase in the portion of non-condensable inert gas results in a reduction in temperature, a decrease in the portion of this gas results in a temperature increase.

For best results, this process is performed at a column pressure in the range from 1.05 to 2.5 bara, preferably from 1.1 to 1.8 bara.

The weight of non-condensable inert gas as compared to the feed quantity of HAS solution should be in the range from the 0.44 to 5.8 times, preferably from 1.8 to 5.4 times the weight of the latter.

CONCISE DESCRIPTION OF THE DRAWING

The FIGURE is a flow diagram depicting the method of the subject invention.

DETAILED DESCRIPTION OF SEVERAL EMBODIMENTS OF THE INVENTION

The nature of the distinguishing features of the solution described and its influence on solving the problems of the invention is as follows:

The processes in the reactive distillation column are performed, as is known per se, above atmospheric pressure. Such a technological solution ensures high safety of the method when the reactive distillation column is relieved.

The stripping medium used is a mixture of steam and a non-condensable inert gas. This is critical for the invention. As the process is performed in a mixture with a non-condensable inert gas, a decrease in process temperature is ensured that increases the product yield by reducing loss due to thermal decomposition and improves the safety of the method by reducing the risk of explosion due to thermal decomposition of the HA.

The presence of a non-condensable inert gas in the vapor phase when carrying out mass transfers (treating the solution of a HA salt with a base, separating the solution obtained by distillation into an aqueous HA solution and a salt fraction, and reconcentration of the aqueous HA solution by distillation) produces a novel technological effect, namely, a reduction in temperature for performing the processes in the reactive distillation column at identical pressure. The physical nature of the temperature reduction in the technological process by the presence of a non-condensable inert gas is based on a change in composition of the vapor phase through changing the partial pressures of its components. The vapor phase in the solution according to the invention consists of a non-condensable gas, steam, and HA. Adding the non-condensable component to the composition of the vapor phase decreases the partial pressures of the other components (that is, steam, HA, and ammonia if an excess of the latter is used). Thus the presence of the non-condensable component in the vapor phase reduces the partial pressures of steam and HA at an identical process pressure and ensures a drop in temperature of the mass transfers. Reducing the process temperature directly affects the solution of the problems raised:

the losses due to thermal decomposition of the HA are reduced, its yield is increased, and process safety is improved by steering the technological process parameters in the reactive distillation column clear of the conditions under which a dangerous effect occurs—thermal decomposition of HA.

As the non-condensable gas at the same time is an inert gas and does not enter into any chemical reaction with the substances involved in the technological process, it ensures the technological reliability and safety of the new method.

Introducing this novel component into the known system does not cause any reactions in the column due to the presence of this new component, which ensures the required purity of the final product, the HA solution. As the gas is non-condensable, this approach prevents major portions of the solution from dissolving into components in the liquid phase and thus excludes contamination.

All inert gases not described herein are in principle suitable as non-condensable inert gases—noble gases, for example. However in production the preferred gas will be nitrogen for economic reasons. Nitrogen meets the technological requirements: It does not enter into a chemical reaction with the components to be separated (that is, with water, HA, HAS, ammonia, and ammonia sulfate) and virtually does not dissolve in them. In addition, nitrogen is readily available and low-cost.

This process is performed at a column pressure in the range from 105 to 250 kPa, preferably from 110 to 180 kPa. The proposed pressure range is the optimum pressure for ensuring process safety. It prevents potential air supply to the process when the column is relieved or process temperature drops. Reducing the process temperature increases HA yield by reducing HA losses due to thermal decomposition.

Process temperature is controlled at a predefined pressure by the quantity or portion of non-condensable gas at the inlet of the column. This procedure causes a novel effect in the solution described: the option to reduce process temperature while keeping the process pressure constant. In this way, the invention is able to combine the advantages of the technological process performed under vacuum (reduced process temperature, reduced HA losses due to thermal decomposition, increased safety) with the advantages of the process under atmospheric pressure (high reliability of plant operation and low costs as there is no need to have vacuum-generating equipment). The fact that a novel technological property occurs in the system described (option to change the process temperature while keeping the pressure constant) proves its difference in principle from known methods and compliance with the criteria of an invention.

The option to change or control the process temperature by varying the quantity of non-condensable inert gas supplied results from a change the addition of a non-condensable inert gas causes in the composition of the vapor phase that reduces the partial pressures of the other components of the vapor/gas mixture. This physical connection results in reducing the boiling point of the salt solution at the bottom of the column and thus a corresponding temperature drop in proportion with the quantity of non-condensable inert gas supplied.

The weight of non-condensable inert gas as compared to the feed quantity of HAS solution should generally be in the range from 0.44 to 5.8 times, preferably from 1.8 to 5.4 times the weight of the latter. This solution provides an optimum relation between the reduction of process temperature and increasing column dimensions parameters. The presence of the non-condensable inert gas in the stripping medium weakens the driving force of the mass transfers as it slightly reduces the concentrations of the substances in the vapor phase which requires a larger contact surface area of the phases, usually achieved by increasing the dimensions of the mass transfer apparatus. Increasing equipment dimensions, however, is at 10% to 20%, which is relatively low.

The non-condensable inert gas used is recirculated into the technological process, which minimizes additional material supplies of the new method and allows for a resource-saving process.

The vapor/gas mixture that is being recirculated is usefully cooled down under formation of a liquid phase with subsequent phase separation in a separator. Absolute moisture content of the vapor/gas mixture to be recirculated is reduced while cooling as the main quantity of it is condensed. This procedure results in drying the non-condensable inert gas, which increases its evaporation potential and facilitates a greater reduction in process temperature when it is supplied to the column.

The non-condensable inert gas is advantageously recirculated by transferring it into a state of thermal equilibrium with the stripping steam. Transferring the non-condensable inert gas into the state of thermal equilibrium with the stripping steam ensures a balancing of the temperatures of the components of the stripping medium. This prevents local overheating of the solution in the reaction part of the column and eliminates HA losses that are due to its thermal decomposition as a result of local overheating.

The non-condensable inert gas can, for example, be transferred into the state of thermal equilibrium with the stripping steam by conducting the non-condensable inert gas into the liquid column of the column bottom upstream of the liquid-phase evaporator. This method makes the best possible use of the heat of the solution that is being discharged. In this way, inert gas comes into contact with the liquid phase conducted in the circuit and is saturated with steam; this reduces the temperature at the column bottom while the stripping steam heats up the inert gas.

If the supply stream contains excess ammonia, the recirculated non-condensable inert gas should be purified of ammonia in an absorber and heated with the used stripping medium for best results. In this way, the excess ammonia is discharged from the technological process, which simplifies the system of controlling the HA production process. The discharged ammonia can also be used in a plant for producing ammonia water, for example.

The subsequent heating up of the purified non-condensable inert gas with the used stripping medium ensures a significant increase in evaporation potential of the gas, which contributes to a greater drop in temperature in the bottom of the reactive column. This is how improved process safety and increased HA yield are achieved.

As the known technological method in accordance with DE 197 33 681 A1 or WO 99/07637 was decisively modified by an additional element, namely a non-condensable inert gas, formation of an explosive ammonia/air mixture when performing the method above atmospheric pressure is prevented, and the thermal decomposition of HA is reduced from the outset by reducing the process temperature. This was not an obvious step, which is why this technological solution amounts to a special inventive achievement.

The known method has only one option of changing (reducing) the process temperature—changing (reducing) the nominal pressure in the column. This way of controlling the process temperature entails increased requirements regarding the functional and technological safety of the pressure control system of the column (the system of producing and maintaining a vacuum, which involves sophisticated equipment. The operating costs and energy demand of the vacuum generation and maintenance system are the higher the greater the range of changing the process temperature as these systems only have a very narrow margin of optimum operating conditions.

The method according to the invention offers a novel way of changing the process temperature while keeping the process pressure constant. This enables the invention to combine the advantages of a technological process operated under a vacuum (lower process temperature—reduced HA losses due to thermal decomposition) with the benefits of a process run at atmospheric pressure and above (high plant operation reliability and improved process safety).

The invention is explained below by an exemplary description of the method without being limited to such description.

The most common HA salt used is an aqueous solution of hydroxyl ammonia sulfate (HAS). A stabilizer can be added to this solution. The volatile base used for the countercurrent treatment of the HA salt in the aqueous solution is ammonia or ammonia water if the process is run at an industrial scale.

The quantity of the volatile base should ensure that the HA salt is completely transformed into free HA or represent a minimal excess quantity. Under the conditions of an excess quantity of ammonia, countercurrent treatment can be discontinuous or continuous at preferred temperatures ranging from 10° C. to 95° C. The products obtained are an aqueous solution that contains free HA and a salty solution from which the HA was removed: the ammonia sulfate solution. The vapor phase contains ammonia that was not involved in the reaction to form HA.

The equipment used in the processes of releasing the HA and separating the solution obtained into an aqueous HA solution and the salt fraction is a reactive distillation column in which the HA salt solution is subjected to countercurrent treatment with ammonia and a stripping medium which is a mixture of steam and a non-condensable inert gas. The preferred non-condensable inert gas is nitrogen as it meets the technological requirements best:

The reaction part of the column (reactive column) can either be equipped with mass transfer plates (perforated bottoms, bubble-cap plates) or packings (Sulzer boilers, Raschig rings, Pall rings). The number of theoretical plates ranges from 5 to 30. The HA salt solution (feeding solution) is supplied to the head of the reactive part of the column (at the uppermost or one of the upper plates or the upper part of the packing). If required, a separator and demister for separating drops that are carried along can be installed above the feed plate. The solution is neutralized and separated in the reactive column so that the salt fraction is extracted from the bottom of the column and the aqueous HA solution is extracted from the level of the feeding plate or higher.

The reactive column is equipped with a forced-circulation reboiler designed as a single-flow shell-and-tube heat exchanger. The solution conducted in the circuit flows into the tubes of the heat exchanger, the heating medium (steam or hot water) into the space between the tubes of the heat exchanger. The temperature of the heating medium is 120 to 130° C. The nitrogen is passed into the solution conducted in the circuit upstream of the liquid-phase evaporator.

The temperature in the reactive column is determined by the pressure and by the ration of the quantity of non-condensable inert gas to the quantity of the feeding solution and covers the range from 65 to 94° C. The pressure in the reactive column is above atmospheric pressure (normal pressure), generally at a range from 1.05 to 2.5 bara, preferably from 1.1 to 1.8 bara. Performing the method in the reactive column under a pressure above the atmospheric pressure ensures a high degree of process safety when the reactive distillation column is relieved. The pressure above the atmospheric pressure is controlled by changing the output of steam/gas mixture that is discharged from the head of the reactive distillation column.

At a HA salt concentration of 20 to 30 percent by weight of HAS in the HAS feeding solution, the water quantity at the bottom of the reactive column is three to eight times, preferably 4 to 6 times the quantity of the feeding solution. The quantity of nitrogen conducted into the bottom of the column is 0.44 to 5.8 times, preferably 1.8 to 5.4 times the quantity of the feeding solution. The temperature of the supplied nitrogen is between 50 and 85° C.

The vaporous or liquid HA fraction taken from the head of the reaction part of the column can be reconcentrated in a distillation column of any technological design. The supply flow in the form of the vaporous HA fraction is passed into the distillation part of the column beneath the lower plate or lower part of the packing. If the supply flow is a HA solution, it is passed into the distillation part of the column at such a level that the number of plates in the driving part to the number of plates in the booster part is at a ratio of 1 to 3. During distillation, a mixture of steam, non-condensable inert gas and ammonia—if an excess quantity of the latter was used—is obtained at the head of the distillation part of the column and a HA solution whose concentration depends on the distillation conditions at the bottom.

The vaporous mixture from the head of the distillation part of the column is compressed and usefully cooled down to 50 to 60° C., a process during which the main quantity of moisture is condensed. The process of cooling the steam/gas mixture to a temperature below the condensation of steam is performed in a partial condenser.

If an excessive quantity of ammonia that is supplied to the reactive column is used in the method for producing HA, the stripping medium discharged as a vaporous steam/nitrogen/ammonia mixture from the head of the distillation column is compressed, usefully cooled down, and subjected to purification from ammonia, after which the purified gas is heated up using the heat of the discharged stripping medium. The discharged stripping medium is cooled and the purified gas heated in a shell-and-tube heat exchanger recuperator.

The discharged cooled stripping medium is purified from ammonia by absorption. This purification process takes place in an absorption column that can either be retrofitted with mass transfer plates (perforated bottoms, bubble-cap plates) or a packing (Sulzer boilers, Raschig rings, Pall rings). The number of theoretical plates ranges from 5 to 12. The discharged stripping medium containing cooled ammonia is supplied under the lower mass transfer plate into the bottom of the column. Water is used as an absorbent and fed into the head of the column (or onto the uppermost or one of the upper plates or upper part of the packing). If required, a separator and demister for separating drops that are carried along can be installed above the uppermost plate. Absorption of the ammonia by water and formation of ammonia water take place in the absorption column in that ammonia water is extracted from the bottom of the column and the purified non-condensable inert gas is discharged from the head of the column. The latter is conducted into the tube-and-shell heat exchanger and recuperator that is heated by the discharged stripping medium.

The non-condensable inert gas is conducted from the partial condenser or heat exchanger and recuperator to the separator in which the pressure of the gaseous phase is controlled and, if required, the gaseous phase is separated from the liquid phase. The separator is a vessel-like device that may contain a demister in its upper part for as complete a separation of drops from the gaseous phase as possible. The liquid phase from the separator can be used as return flow into the distillation part of the column and as feeding water flow for generating steam in the bottom of the reactive column.

The separator ensures constant pressure of the steam/gas mixture at a defined level by automated supply and discharge of non-condensable inert gas from an external source. The pressure of the steam/gas mixture is maintained at a defined level using a system of inlet and outlet valves installed behind the separator and connected to its upper part together with pressure sensors. If the pressure of the steam/gas mixture is lower than the set pressure value, the inlet valve opens and non-condensable inert gas is supplied until the set pressure is reached. If the pressure of the steam/gas mixture has exceeded the set pressure value, the outlet valve opens and discharges the excessive quantity of non-condensable inert gas into the outer system until the set pressure is reached.

The temperature in the reactive distillation column is controlled by controlling the supply of non-condensable inert gas to the column inlet. It is preferred to change the feeding of non-condensable inert gas depending on the feeding quantity of the 25% to 30% HAS solution. The feeding quantity of non-condensable inert gas may also be changed depending on the temperature in the reaction part of the column. Supply of gas is controlled using a valve that is installed in the feed line for the non-condensable inert gas at the inlet of the column. The pressure in the line upstream of the valve is kept constant by controlled supply and flow-off of non-condensable inert gas.

Assuming the column temperature is controlled as described using the quantity of non-condensable inert gas supplied depending on the quantity of HAS solution supplied, a required constant column temperature of 91° would, for example, require an increase in the supply of non-condensable inert gas from 4.2 to 10.4 kg per kg of supplied HAS solution within an interval of pressure increase from 1.1 to 1.8 bar.

Performing the method in the reactive column under a pressure above the atmospheric pressure ensures a high degree of process safety when the reactive distillation column is relieved. As the process is performed in a mixture with a non-condensable inert gas, a decrease in process temperature is ensured that increases the product yield by reducing loss due to thermal decomposition and improves the safety of the method by reducing the risk of explosion due to thermal decomposition of the HA.

The change in the quantity of non-condensable inert gas at the column inlet results in a novel technological effect in the solution described: a change in process temperature at a defined pressure in the column. For example, if the nitrogen quantity supplied is increased from 2.1 to 4.2 kg per kg of HAS solution supplied at a defined pressure of 1.1 bar, the column temperature drops from 99° C. to 91° C.

Recycling the non-condensable inert gas involves recirculating the non-condensable inert gas used into the technological process, which minimizes additional material supplies of the new method and allows for a resource-saving process.

Transforming the non-condensable inert gas into the state of thermal equilibrium with the stripping steam in the bottom of the column ensures temperature adjustment of the stripping medium components before they come into contact with the HA-containing solution. This prevents local overheating of the solution in the reaction part of the column and eliminates HA losses that are due to its thermal decomposition as a result of local overheating.

Supplying the non-condensable inert gas to the bottom solution upstream of the liquid-phase evaporator ensures that the heat of the solution being discharged is utilized while saturation of the gas with steam at the same time lowers the temperature in the column bottom.

Advantages of the method according to the invention include that it improves safety, that it is performed at mild temperatures, and that it utilizes the heat of the technological flows that are being discharged.

An example of the method is shown in FIG. 1 but the method is not limited to this example. Wherein:
A Reactive distillation column, reaction part (reactive column)
B Reactive distillation column, distillation part (distillation column)
C Evaporator (at the bottom of the reactor column)
D Compressor
E Valve
F Valve
HAS solution supply
Ammonia supply
Water supply
Recirculated steam/gas mixture supply
Steam or hot water supply
Discharge from the bottom
Steam/liquid mixture supply via evaporator
Saline solution
Column return inlet
HA solution discharge
Steam/gas mixture discharge
Non-condensable inert gas supply or discharge The figure shows the method for stripping and separating the HA in the reactive distillation column (A+B) using the recirculated steam/gas mixture as a stripping medium.

The lower part of the column is the reaction part (A=reaction column), the upper part is the distillation part (B=distillation column). The bottom of the reaction column is equipped with the evaporator (C).

The HAS solution (1) is passed into the head of the reaction column. Ammonia (2), water (3), and the recirculated steam/gas mixture (4) that consists of the non-condensable inert gas, steam and, optionally, ammonia residues if (2) was applied in excess, are passed into the bottom of the reaction column.

This steam/gas mixture is passed upstream of the evaporator (C) into the bottom solution conducted in the circuit. The quantity of the steam/gas mixture supplied to the column is changed depending on the HAS solution feeding quantity and the selected column temperature using the pressure control valve (F) so that the weight ratio of steam/gas mixture to HAS solution supplied is kept constant.

The evaporator (C) is heated with steam of hot water (5) so that the main part of the bottom flow (6) circulates through the evaporator and runs back to the column as steam/liquid mixture (7). The HA is stripped and separated in the column by extracting the saline solution (8) from which most HA has been removed from the bottom of the column and by discharging a salt-free steam/gas mixture. The latter consists of steam, the non-condensable inert gas, HA, and portions of ammonia if (2) has been applied in excess.

This steam/gas mixture from the head of the reaction column is conducted as supply flow to the distillation column that is sprinkled with the return flow (9). The HA solution that is stripped of salts (10) is removed from the distillation column either via a lateral discharge or the column bottom. The steam/gas mixture from which the HA was removed (11) is discharged from the head of the distillation column; it consists of steam, the non-condensable inert gas, and ammonia if (2) was applied in excess.

This mixture is compressed in the compressor (D) and conducted in a circuit to the bottom of the reaction column, most usefully after most of the steam and ammonia portions were separated in an upstream condenser and an absorption column that are both charged with water as cooling and absorption medium. Constant pressure of the steam/gas mixture within the circuit is maintained by adding or removing non-condensable inert gas (12) at a suitable site using control valves. The pressure in the column is kept at the defined value above the atmospheric pressure by changing the quantity of the steam/gas mixture that is discharged from the head of the column using the control valve (E).

EXAMPLES OF PERFORMING THE METHOD

Example 1

Recovery of free HA from HAS in a countercurrent process with ammonia in a reactive distillation column by direct supply into the bottom of the reaction part of the column and simultaneous separation of an aqueous HA solution from the ammonia sulfate solution by stripping it with a mixture of steam and nitrogen while stoichiometrically adding ammonia.

1421 g/h of HAS solution were directly passed into the head of the reaction part of the column. 3500 g/h of water and 370 g/h of ammonia water and nitrogen at a weight ratio of 4.4 to 1 in relation to the HAS solution supplied are supplied to the bottom of the reaction part. No stabilizer was added. The pressure in the bottom was 1.1 bara. The bottom liquid from the reaction part of the column contained about 1.70 percent by weight of HA and 16.41 percent by weight of a summary quantity of AS and HAS The temperature at the bottom of the reaction part of the column was 83.8° C.

A vaporous flow of HA, steam, and nitrogen at an HA concentration of 0.36 mole percent was discharged from the head of the reaction part of the column and conducted under the lower plate of the distillation part of the column. The flow discharged from the head of the distillation part of the column did not contain any HA. The bottom liquid solution from the distillation part of the column contained 8.91 percent by weight of HA. HA decomposition was 2.14%. The HA yield was 84.17 percent by weight.

Example 2

Recovery of free HA from HAS in a countercurrent process with ammonia in a reactive distillation column with simultaneous separation of an aqueous HA solution from the ammonia sulfate solution by stripping it with a mixture of steam and nitrogen and an excessive quantity of ammonia.

710 g/h of HAS solution were directly passed into the head of the reaction part of the column. 3500 g/h of water and 541 g/h of ammonia water and nitrogen at a weight ratio of 5.3 to 1 in relation to the HAS solution supplied are supplied to the bottom of the reaction part. The column bottom was heated. The pressure at the bottom of the reaction part of the column was 1.1 bara. HA was isolated and separated with no stabilizer present.

The bottom liquid solution from the reaction part of the column contained about 0.22 percent by weight of HA. The bottom liquid solution from the distillation part of the column contained 5.47 percent by weight of HA. HA decomposition was about 2%. The HA yield was 95.8 percent by weight.

The invention claimed is:

1. A method for producing an aqueous solution of free hydroxylamine (HA) using simultaneous countercurrent treatment of an aqueous HA salt solution with ammonia or ammonia water at a process temperature, separating the solution obtained by distilling into aqueous solutions of HA and a salt fraction under a pressure above the atmospheric pressure, reconcentrating by distilling the aqueous HA solution in the countercurrent with a strip medium in a reactive distillation column with a liquid-phase evaporator, wherein the stripping medium is a mixture of steam and a non-condensable inert gas and controlling the process temperature at a defined pressure by the quantity of non-condensable inert gas at the column inlet.

2. The method according to claim 1, wherein nitrogen is used as the non-condensable inert gas.

3. The method according to claim 1, wherein the step of controlling the process temperature includes increasing the portion of non-condensable inert gas to results in a drop in temperature.

4. The method according to claim 1, wherein the process is performed at column pressures in the range from 1.05 to 2.5 bara.

5. The method according to claim 1, wherein the weight of the non-condensable inert gas is 0.44 to 5.8 times the weight of the feeding quantity of the aqueous solution of HA salt.

6. The method of claim 1 wherein the step of controlling the process temperature includes decreasing the portion of said gas to result in an increase in temperature.

* * * * *